Dec. 13, 1932.  G. O. JOYNER  1,890,609
SPRING MOTOR
Filed May 1, 1931  3 Sheets-Sheet 1

Inventor
GEORGE O. JOYNER

By Riordan & Riordan
Attorneys

Dec. 13, 1932.  G. O. JOYNER  1,890,609
SPRING MOTOR
Filed May 1, 1931  3 Sheets-Sheet 2

Inventor
GEORGE O. JOYNER
By Riordan & Riordan
Attorneys

Dec. 13, 1932.     G. O. JOYNER     1,890,609
SPRING MOTOR
Filed May 1, 1931     3 Sheets-Sheet 3
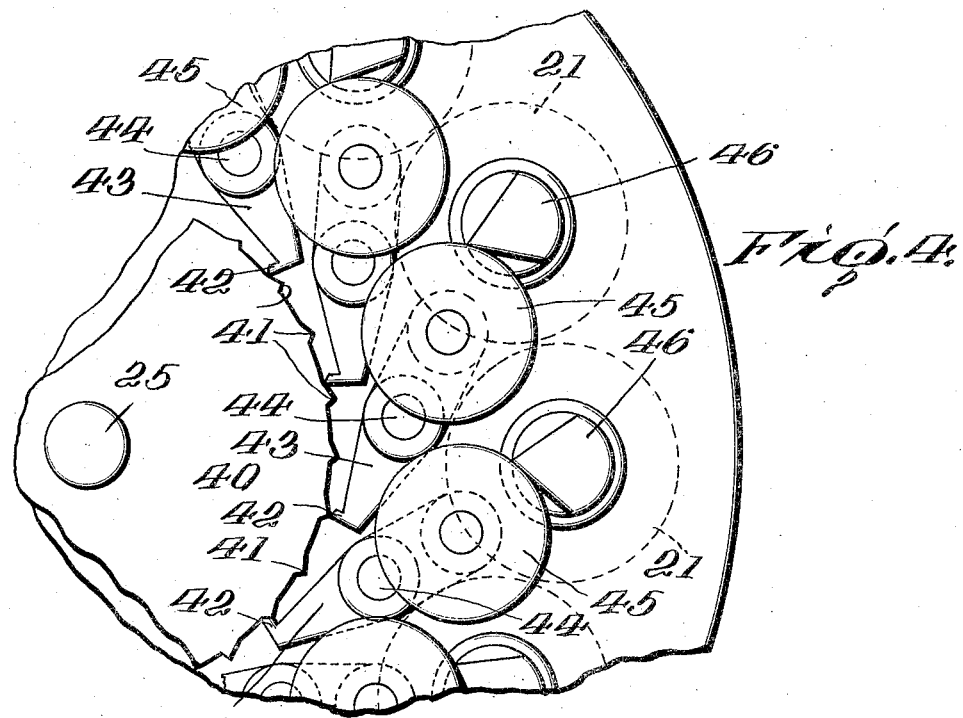
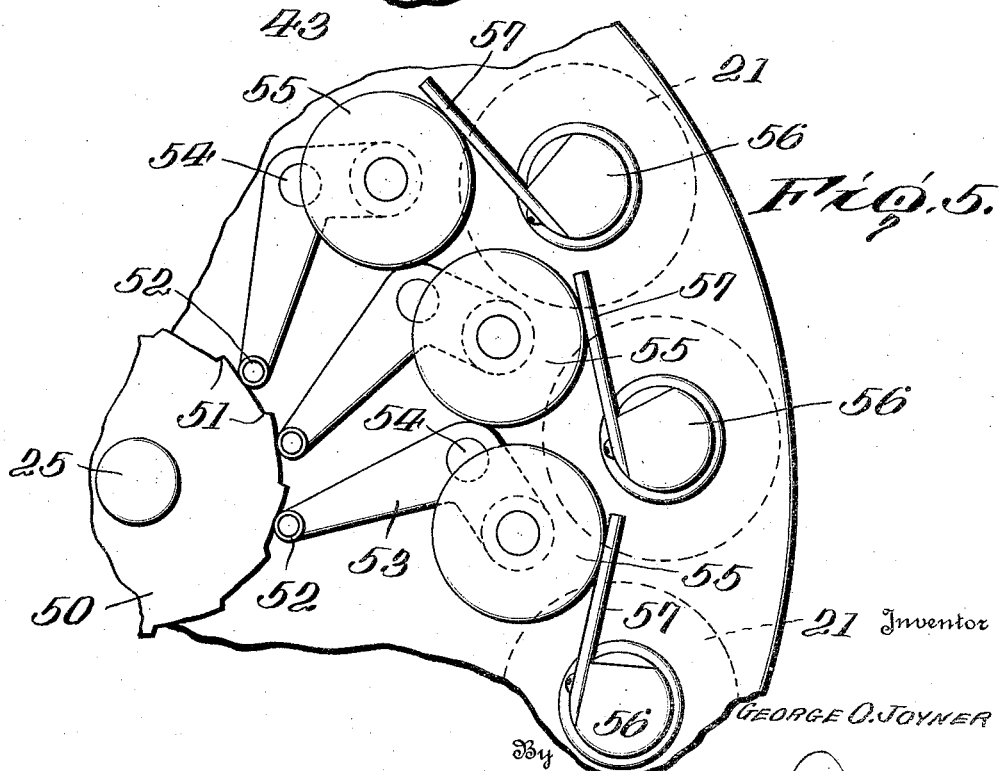
Inventor
GEORGE O. JOYNER
By
Riordan & Riordan
Attorneys Patented Dec. 13, 1932

1,890,609

UNITED STATES PATENT OFFICE

GEORGE O. JOYNER, OF ST. LOUIS, MISSOURI

SPRING MOTOR

Application filed May 1, 1931. Serial No. 534,389.

This invention relates to spring motors and more particularly to an improvement on the type of motor illustrated and described in Patent No. 1,833,838, dated Nov. 24, 1931, in which is disclosed a motor dependent for its operation upon a series of spring units harnessed in such a manner that all contribute to furnish power to an ultimate take-off, the units being interconnected for simultaneous operation, and effective to store energy which is subsequently taken off from one end of the motor.

The units in this motor each include a housing having a number of spring drums therein capable of storing energy and releasing same in proper sequence.

The present improvement concerns itself with a novel rewinding mechanism for the several spring drums of a unit, and while but a single unit is illustrated it is obvious that as many units as desired, each comprising a number of spring drums or housings may be utilized in accordance with the principles set forth in the above mentioned application.

For a more complete disclosure of the basic principles involved in this motor, reference may also be made to my prior Patent No. 1,776,360, dated September 23rd, 1930.

Among the objects of the present invention is the arrangement of the spring and spring drums in such a manner as to permit a storing up of energy for the operation of a power shaft in combination with means to replenish the stored up energy when and as it is given off to the shaft.

Another object is to provide a rewinding mechanism which utilizes a portion of the stored up energy in one spring or group of springs as a means of replenishing the energy given off by another spring, thus prolonging the operative life of the motor.

Convenient methods of restoring energy by the application of power from an outside source may be found by reference to the aforesaid patent and application.

To the attainment of the above and other objects which will appear as the description proceeds, reference may be made to the accompanying drawings, in which:—

Fig. 4 is an enlarged fragmentary elevation of a modified form of rewinding mechanism; and Fig. 5 is a similar view of still a different modified form of rewinding mechanism.

Figure 1:
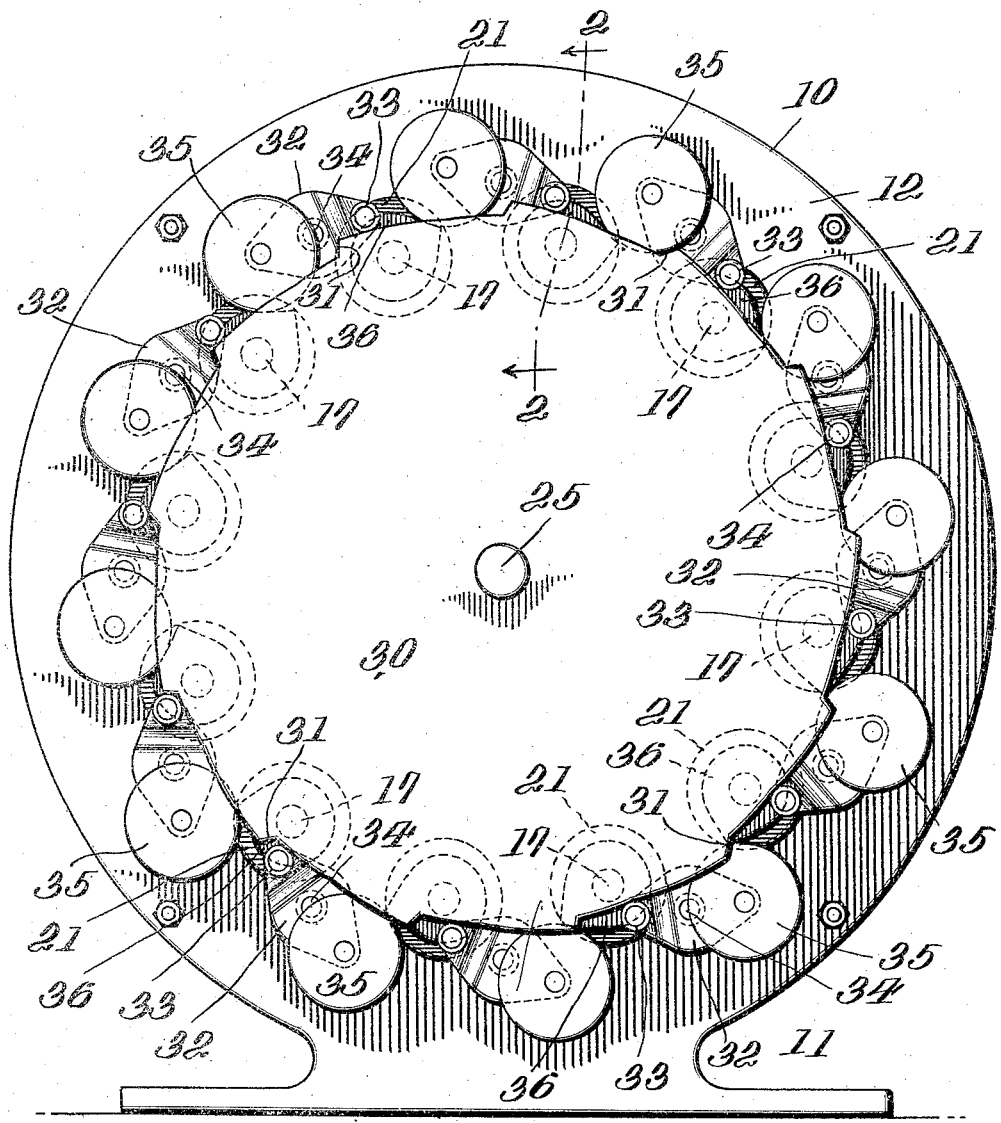
Fig. 1 is an elevation of a motor unit showing the rewinding mechanism.

Referring more specifically to the drawings, in which like reference numerals designate like parts, it will be noted that the motor unit comprises a housing 10 mounted on a base 11, the housing or casing 10 consisting of outer walls 12 and 13 and an annular enclosure 14. Within the casing 10 are mounted a plurality of spring drums 15, there being twelve of these drums in the embodiment disclosed.

Figure 2:
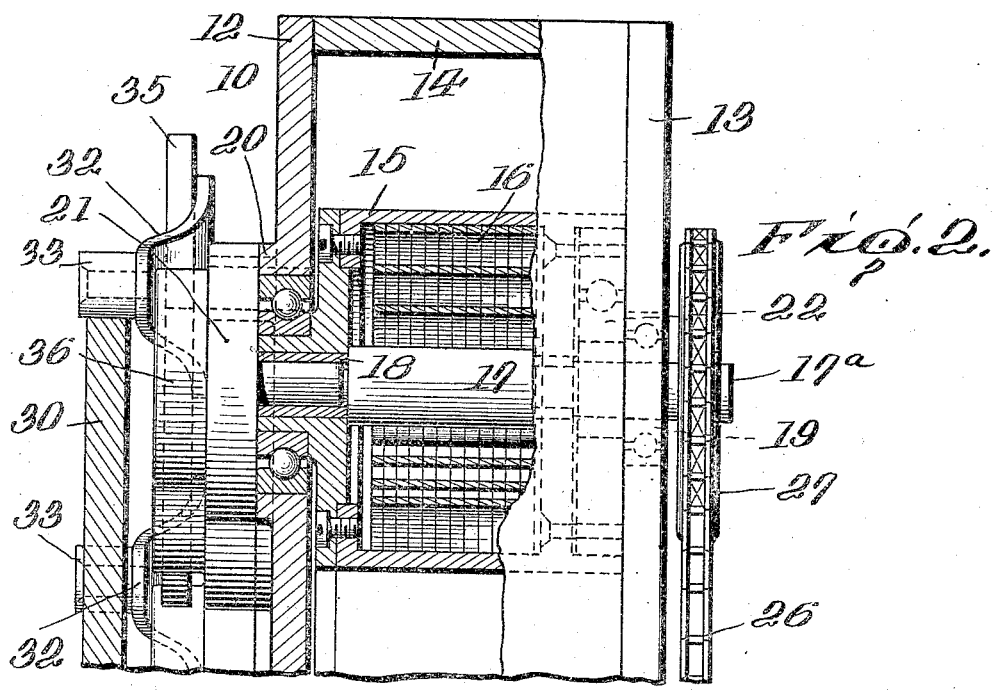
Fig. 2 is a fragmentary section of one of the spring drums, taken on the line 2—2 of Fig. 1.
Figure 3:
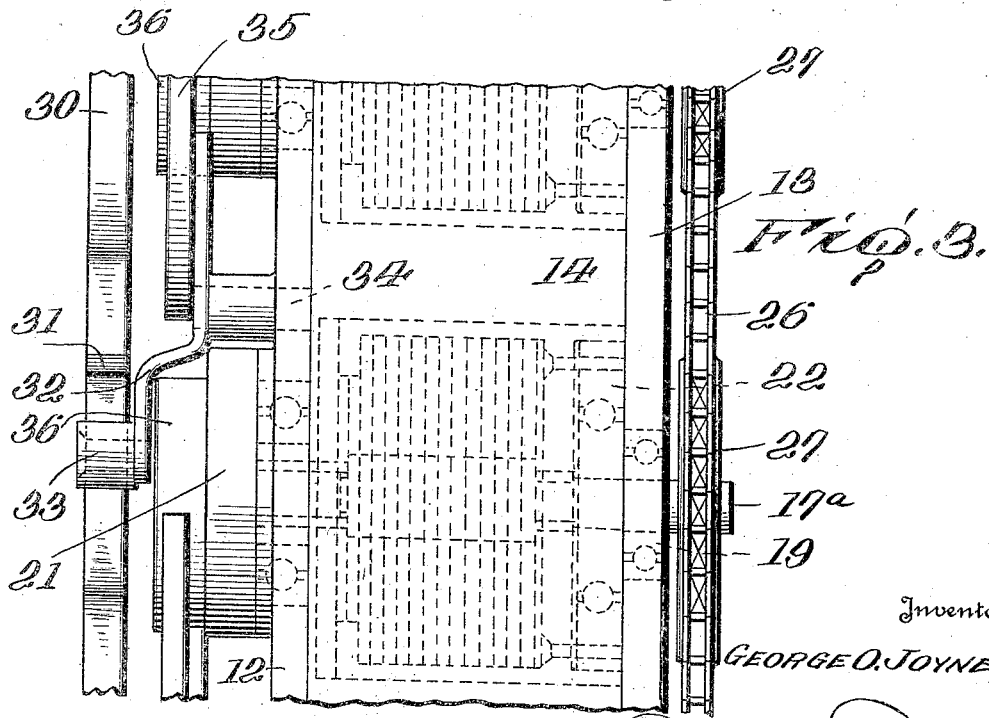
Fig. 3 is a fragmentary edge view looking in a direction substantially at right angles to Fig. 2.

Within each of the drums is a spring or series of springs 16, these springs being fastened at their outer ends to a drum 15 and at their inner ends to a shaft 17 operating freely in the drum. One end of the shaft will rest in a bearing formed by a hub or boss 18 extending from the drum and the other end will rest in a bearing 19, in the frame housing. Each of the drums will be provided with suitable bearings 20 in the frame housing, as indicated in Figs. 2 and 3.

The drum 15 is provided with a one-way clutch 22, of convenional design, to prevent retrograde movement thereof.

A line shaft 25 is desirably provided centrally of the motor from which power may be taken off and this shaft may be driven in any conventional manner from the series of drum shafts 17. One example of the means for driving shaft 25 will be found in my patent above mentioned wherein a large gear is mounted on any one of the spring driven shafts 17, and meshes with a pinion on the shaft 25, or it may be driven in a manner similar to that of my aforesaid application, by means of a sprocket chain connecting a gear on the shaft 17 to a suitable gear on the shaft 25. The particular manner of driving the line shaft is not illustrated, as it is merely necessary to provide gearing of suitable ratio between any one of the drum shafts and the power shaft.

Each of the drum shafts mounts a gear 27, which gears are connected by means of a tie chain 26, the effectiveness of this arrangement being to produce a volume of power equal to the sum of the springs of the twelve spring drums. The springs within the drums may be initially wound and rewound from time to time by any suitable means, as by application of power to rotate the drums individually, or by automatic rotation of the shafts 17, in the manner hereinafter described. The end 17a of the stub shaft projecting from the drum may be provided with a socket adapted to receive a suitable crank.

An essential feature of the present improvement resides in means for automatically rewinding, or partially rewinding the springs during operation of the motor. To this end there is provided a cam plate 30 having a series of cam projections 31, the plate or disc 30 being keyed to the shaft 25 for rotation therewith. The number of these projections will amount to one more than the number of spring drums.

Mounted on the frame 10 is a series of levers or arms 32 each having a roller 33 on one end engageable with the cam surfaces 31, the arms being pivoted at 34. A roller 35 is mounted on opposite ends of each arm 32. Each shaft 17 has fixedly mounted thereon a wedge-shaped cam 36, in the path of the roller 35. A clutch 21 is built into, or affixed to the wedge 36, and connected to the hub 18 of the drum 15. The two clutches 21 and 22 thus control the drum 15, and its movement relative to the housing 10 and the wedge 36. If desired, both clutches may be located adjacent the same end of the drum, rather than at opposite ends.

Having thus described my invention the operation thereof will be readily apparent.

The motor, being initially wound is started into operation, the spring shafts 17 rotating under the influence of the spring 16, and the drums 15 being held against a retrograde movement by their clutches. The rotation of the shafts 17 imparts movement to the power shaft 25, which may if desired be provided with a fly wheel to increase the inertia thereof.

As the disc 30 rotates, the cam projections 31 successively engage the rollers 33, forcing the rollers 35 inwardly against the wedge members 36, one of which is keyed to each shaft 17, causing a fractional rotation of the respective shafts 17, thus rewinding the springs which are fastened to the shafts a corresponding amount. It will be noted that the clutches 21 and 22 permit this rewinding movement, while preventing a retrograde action of the wedges and drums, and it is thus possible to wind the springs while they are giving off power through the drum and the sprocket gear geared to chain 26. The shafts 17 are, in effect, "free wheeling" in so far as the clutches and drums are concerned.

The parts are so proportioned that a complete rotation of the disc 30, which imparts thirteen fractional rotative movements to the shaft 17 produce a complete rotation of the shaft 17.

The effective energy of each spring drum is thereby prolonged.

This rewinding mechanism is susceptible to modification, and two modifications thereof are illustrated in Figs. 4 and 5. In Fig. 4, the disc 40 is provided with a series of projections 41 which engage the ends 42 of levers 43 pivoted at 44 to the frame housing, and having rollers 45 mounted on the end thereof opposite the end 42 and engageable with wedge shaped elements 46. The elements 46 are mounted on the outer ends of the shafts 17, and the operation of this form is substantially the same as that of Fig. 1.

In Fig. 5 the disc 50 has projections 51 thereon engaging rollers 52 on the ends of bell crank levers 53 pivoted at 40 to the frame housing, the other ends of the levers carrying rollers 55.

The wedge shaped elements 56, in this form of the invention instead of directly engaging the rollers 55 are provided with fingers 57 engageable with the rollers. The operation of this form is likewise similar to that of Fig. 1. The advantages of the particular modifications are mainly those of assemblage, namely, the parts are spaced somewhat differently from the form of Fig. 1, and a smaller cam disc is permitted in each instance.

Having thus described my invention, what I claim as new and desire to secure by Letters Patent of the United States, is:—

1. In a motor, having a power shaft, and a series of spring power units connected to drive said shaft, the combination with means to rewind said power units comprising a driven member operatively connected to said shaft, and a connection between each of said units and said member effective upon actuation by said member to impart a successive series of fractional rotative movements to its unit, during a single rotation of said shaft.

2. In a motor, having a frame, a power shaft, and a series of spring power units connected to drive said shaft, the combination with means to rewind said power units comprising a cam disc operatively connected to said shaft, and a connection consisting of an arm pivoted on the motor frame and having one end engageable with said cam disc and the other end engageable with said power unit, effective upon actuation by said disc to impart a successive series of fractional rotative movements to its unit, during a single rotation of said shaft.

3. In a motor, having a frame, a power shaft, and a series of spring power units connected to drive said shafts, the combination with means to rewind said power units comprising an actuating member on each unit, a cam disc on the shaft, and a connection consisting of an arm pivoted on the motor frame and having one end engageable with said cam disc and the other end engageable with said actuating member, effective upon actuation by said disc to impart a successive series of fractional rotative movements to its unit, during a single rotation of said shaft.

4. In a spring motor having a frame, and a power shaft, a series of revoluble drums mounted in said frame, a shaft extending through each of said drums, a spring within each drum connecting the drum to its shaft, means connecting each drum to the power shaft whereby rotation of the drums under influence of the springs will impart a movement to said power shaft, and means to rewind the spring drums comprising a member rotatable with said power shaft, a member rotatable with said drum and means connecting said members and effective upon actuation thereof by said first member to impart a successive series of movements to said second member during a single rotation of the shaft, thereby to rotate said drum.

5. In a spring motor having a frame, and a power shaft, a series of revoluble drums mounted in said frame, a shaft extending through each of said drums, a spring within each drum connecting the drum to its shaft, means connecting each drum to the power shaft whereby rotation of the drums under influence of the springs will impart a movement to said power shaft, means to rewind the spring drums comprising a cam disc mounted on said power shaft for rotation therewith, a cam wedge rotatable with said drum and a tappet interposed between said disc and wedge and effective upon actuation thereof by said disc to impart a movement to said wedge, thereby to rotate said drum.

6. A motor comprising a line shaft, a plurality of spring shafts geared thereto, springs acting on the spring shafts and means for winding the springs comprising a cam surface on each of the spring shafts, and means actuatable by the line shaft during rotation thereof to engage said cam surface and effect a partial rotation thereof.

7. A motor comprising a line shaft, a plurality of spring shafts geared thereto, springs acting on the spring shafts and means for winding the springs comprising a cam surface on each of the spring shafts, and means actuatable by the line shaft during rotation thereof to successively and intermittently engage said cam surface and effect a rotation thereof.

8. A motor comprising a line shaft, a plurality of spring shafts geared thereto, springs acting on the spring shafts and means for winding the springs comprising a cam surface on each of the spring shafts, and a series of projections extending from the line shaft and movable therewith to successively and intermittently engage said cam surface and effect a rotation thereof.

9. A motor comprising a line shaft, a plurality of spring shafts geared thereto, springs acting on the spring shafts and means for winding the springs comprising a cam surface on each of the spring shafts, a disc on the line shaft having a series of cam surfaces, and means successively engaging said cam surfaces, and operatively connecting said disc and said spring shaft surfaces to successively impart rotative movement to the spring shafts.

10. A motor comprising a frame, a line shaft, a plurality of spring shafts arranged concentrically about the line shaft and geared thereto, power springs each connected at one end to its shaft and at the other end to the gearings, a plurality of actuating arm mounted on the frame, one for each spring shaft, cam means on the power shaft for actuating each of said arms, cam means on each spring shaft, actuatable by said arms, and means whereby movement of an arm in one direction will rotate its respective spring shaft and wind the spring attached thereto.

11. A motor comprising a frame, a line shaft, a plurality of spring units consisting of a drum, a shaft therein and a spring having its ends respectively connected to the drum and shaft, said units being arranged concentrically about the power shaft and geared thereto, a plurality of actuating arms mounted on the frame, one for each unit, means for actuating each of said arms, cam means for each unit actuatable by said arms, and means whereby movement of an arm in one direction will produce relative rotation between its drum and shaft, and wind the spring therein, and means for restraining said drum and shaft against retrograde movement.

12. A motor comprising a line shaft and a plurality of spring units, each consisting of a drum member and a shaft member connected by a spring, means to impart rotation to one of said members and to hold the other of said members against retrograde movement thereby to effect a winding moment in the spring, and means to hold said first member against retrograde movement, while releasing said second member thereby to effect an unwinding moment, said first means including a cam on the line shaft and a cam on the power unit and operative connections therebetween.

13. In a spring motor having a power shaft, the combination of a plurality of spring motor units, means to store energy in each of said units comprising a cam on the power shaft having a series of projections, a cam wedge on each of said units and means connecting said projections and said wedges whereby rotation of the cam on the power shaft will impart a succession of intermittent rotative movements to the unit, means to harness said units to each other whereby the total energy of the several units may be applied to the power shaft, and means to release such energy from the motor.

14. A rewinding mechanism for spring motors having a power spring, comprising a driven cam, and a cam wedge connected to the spring, and connections therebetween consisting of a pivoted lever, a projection on one end thereof engageable with said power cam and a roller on the other end engageable with said spring cam.

15. A rewinding mechanism for spring motors having a power spring, comprising a driven cam, a tappet arm connected to the spring, and connections therebetween consisting of a pivoted lever, a projection on one end thereof engageable with said power cam and a roller on the other end, engageable with said tappet arm, said cam having a plurality of cam surfaces disposed about its periphery, whereby said tappet arm will impart a plurality of winding movements to the power spring, for a single rotation of the cam.

16. In a motor of the type described, a frame housing, a plurality of spring units rotatably mounted in said housing, a shaft mounted in each of said units for relative rotation therewith, spring means connecting each shaft into its respective unit, means to wind the springs in the units while the respective spring shafts are releasing energy stored in the springs, comprising a power shaft geared to said units, a cam disc keyed to said power shaft, a cam wedge keyed to each unit, and operative connections between said disc and wedges, effective to produce a winding moment in the units upon actuation by the disc.

In testimony whereof I affix my signature.

GEORGE O. JOYNER.